United States Patent [19]

Silverman

[11] Patent Number: 4,572,662
[45] Date of Patent: Feb. 25, 1986

[54] WIRE AND WIRE LIKE OBJECT DETECTION SYSTEM

[75] Inventor: Bernard B. Silverman, West Hartford, Conn.

[73] Assignee: The United States of America as represented by the Secretary of the Army, Washington, D.C.

[21] Appl. No.: 439,466

[22] Filed: Nov. 5, 1982

[51] Int. Cl.$^4$ .......................... A01C 3/08; G01B 11/26
[52] U.S. Cl. .......................................... 356/5; 356/152
[58] Field of Search ...................... 356/5, 152, 28, 285; 350/6.3, 6.4, 6.9

[56] References Cited

U.S. PATENT DOCUMENTS

| | | | |
|---|---|---|---|
| 3,226,721 | 12/1965 | Gould | 350/6.3 |
| 3,950,100 | 4/1976 | Keene et al. | 356/28.5 |
| 3,984,686 | 10/1976 | Fletcher et al. | 356/28 |
| 4,118,109 | 10/1978 | Crawford et al. | 350/6.4 |
| 4,401,886 | 8/1983 | Pond et al. | 356/152 |
| 4,457,621 | 7/1984 | Harris et al. | 356/152 |

Primary Examiner—S. C. Buczinski
Assistant Examiner—Gregory C. Issing
Attorney, Agent, or Firm—Anthony T. Lane; Jeremiah G. Murray; Robert A. Maikis

[57] ABSTRACT

An optical radar operating in the infrared region of the spectrum and adapted to efficiently detect elongated targets such as wires. The pulsed transmitter is preferably passively Q-switched and produces optical pulses polarized in one direction. A CW local oscillator laser is locked to a frequency slightly offset from the transmitter frequency. A Brewster angle duplexer and a quarter wave plate in the transmit/receive path of the radar permit the transmitter flux to pass to a scanner and direct the orthogonally polarized echo signals to the heterodyne receiver which includes a display or alarm circuit. The transmitter and local oscillator lasers include frequency control circuits. Either wedge or ball joint type scanners may be used to scan the radar beam over a target area of interest.

6 Claims, 9 Drawing Figures

WIRE AND WIRE LIKE OBJECT DETECTION SYSTEM

The Government has rights in this invention pursuant to Contract DAAK80-79-C-0278, awarded by the Department of the Army.

BACKGROUND OF THE INVENTION

In certain tactical situations, military aircraft are required to operate at very low altitudes, in the so-called nap of the earth (NOE) mode in order to escape detection by taking advantage of the masking effect of nearby hills and trees. In this mode, helicopters often fly at altitudes of a few feet or even inches above ground level with their landing gear literally in the grass. Elongated objects such as wires and fences which can be difficult to see even in clear weather present a serious hazard to such flight modes. The present invention is a sensor or detection system especially designed to detect such elongated obstacles in the aircraft's path and to provide the pilot with an appropriate warning. The system is designed to be packaged in a pod for attachment to the aircraft's fuselage.

The detection system comprises an optical radar operating in the 10 micron wavelength region with a modulated transmitter laser and a continuous wave (cw) local oscillator laser arranged for heterodyne detection of target echoes. The apparatus includes a scanner for directing the radar beam in a desired pattern forward of the aircraft, a Brewster angle duplexer, beam combiner and distributor optics, beam expanding and contracting optics, cryogenically cooled detectors, a receiver including signal processing circuits and warning and alarm circuits.

SUMMARY OF THE INVENTION

A preferred embodiment of the invention comprises a pulsed transmitter laser which is passively Q-switched and operates at a relatively constant pulse repetition frequency (PRF) with a pulse length of approximately 200 nanoseconds. The transmitter optical and PRF frequency are automatically controlled by means of a control loop including an adjustable line selection grating. The Brewster angle duplexer is located in the path of the transmitted beam as well as in the target echo path. The transmitter optical flux or beam polarization is plane and in such a direction that it passes through the duplexer with a slight shift in its optical axis. The transmitted beam then passes through a quarter wave plate and a beam expander and thence to the scanner. The scanner may be of the rotating optical wedge type or it may comprise a ball-joint scanner which includes a mirror mounted on a ball joint. The mirror is moved by means of a motor driven system of cams to provide a desired scan pattern. The scan patterns are selected to efficiently detect elongated targets of the types described. The local oscillator is slaved to the transmitter frequency by means of a control loop which maintains a constant difference frequency between the transmitter and the CW local oscillator.

The duplexer directs the target echoes to the receiver circuitry based on the orthogonal polarization of the echoes relative to the transmitted signal caused by the presence of the aforementioned quarter wave plate in the paths of the transmitted beam and the target echoes. The local oscillator output has a polarization to match the orthogonal polarization of the target echoes and it is combined with the target echo signals at the duplexer. Before application of the local oscillator output to its control loop, its plane polarization is rotated by 90° to match the polarization of the transmitter output with which it must be combined at the detector of the aforementioned control loop. The local oscillator is offset from the transmitter frequency by a fixed amount which becomes in effect the intermediate frequency (IF) of the heterodyne radar system.

The components of the novel detection system have been selected to provide the desired system performance with minimum size and weight.

Other types of transmitters may be utilized in this system in place of the passively Q-switched pulsed transmitter mentioned above.

It is thus an object of the invention to provide an optical obstacle detection system adapted for use on low flying aircraft and capable of efficiently detecting elongated obstacles in the flight path of the aircraft.

Another object of the invention is to provide a heterodyne optical radar utilizing a $CO_2$ laser transmitter with a local oscillator laser slaved to said transmitter, in which a Brewster angle duplexer is utilized to couple the transmitter output to a common transmit/receiver path comprising a quarter wave plate, a beam expander/compressor and a scanner capable of directing the transmitter beam in a desired pattern, and in which the target echo signals are merged with the local oscillator output at the duplexer with the same plane polarization, and the difference or IF frequency is detected by a signal detector comprising a liquid nitrogen cooled photovoltaic diode. The detected signals are then applied to a signal processor and thence to a display or alarm circuit.

Another object of the invention is to provide scanning patterns for aircraft radars which will efficiently detect elongated objects such as wires which may be in the aircraft's flight path.

Another object of the invention is to provide a novel scanner which can be easily arranged to scan in a pattern which will efficiently detect elongated targets such as wires.

These and other objects and advantages of the present invention will become apparent from the following detailed description and the drawings.

DETAILED DESCRIPTION OF PREFERRED EMBODIMENTS

Figure 1:
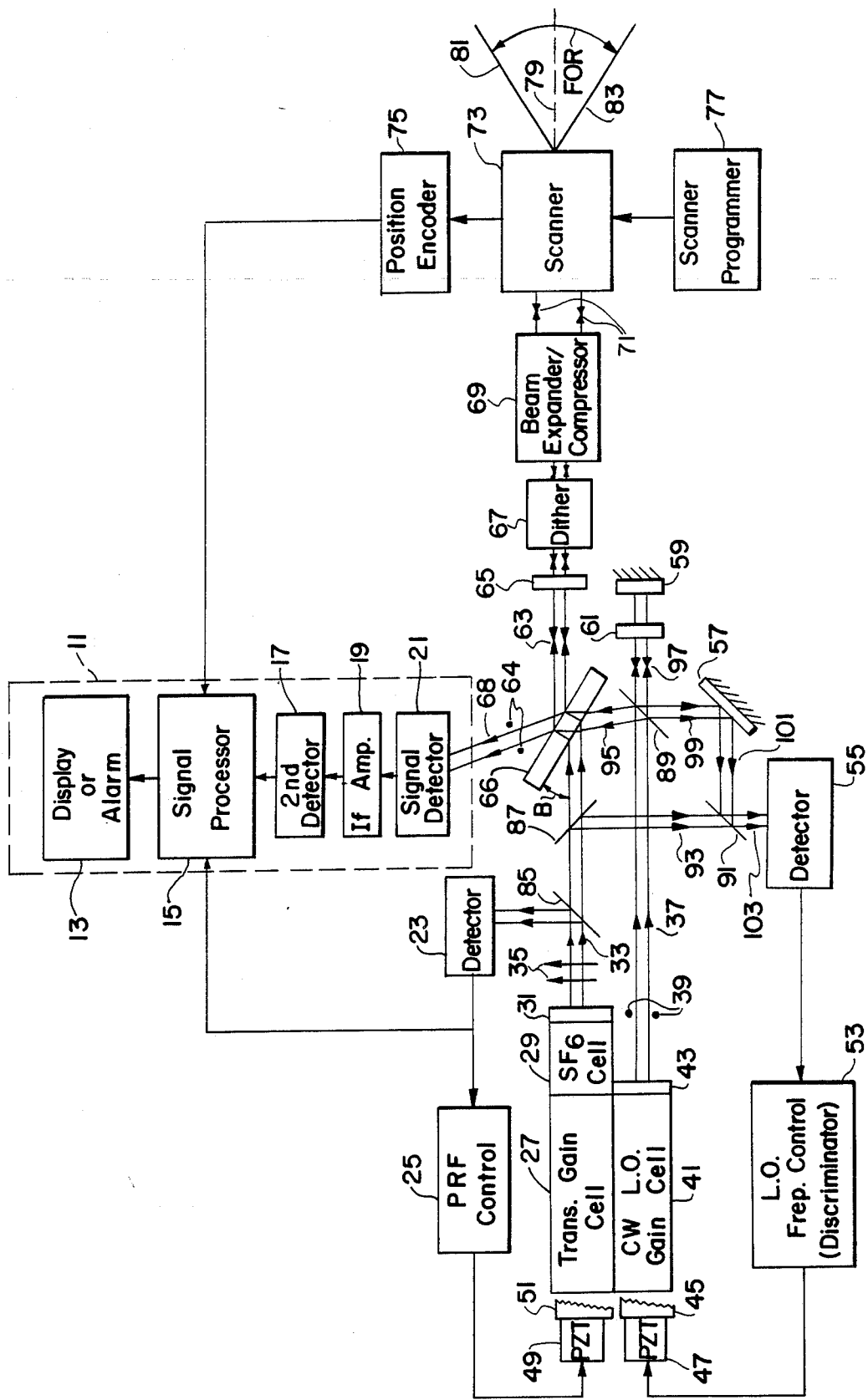
FIG. 1 is a block diagram of a preferred embodiment of the novel detection system.

While other types of transmitters can be used in the present invention, the intracavity, passively Q-switched laser shown in FIG. 1 is preferred because of its simplicity, low power requirements and low weight. This transmitter comprises a continuous wave (CW) laser gain cell 27 which may comprise a waveguide section filled with the lasing medium which can be $CO_2$ gas and diluents such as nitrogen to provide upper-level energy storage and helium to provide lower-level energy removal, with a suitable continuous dc or RF excitation to provide the required population inversion. The partially reflective mirror 31 forms the output end of the transmitter laser cavity and the longitudinally adjustable diffraction grating 51 the other end of the cavity. The $SF_6$ cell 29 is located within the laser cavity to provide passive Q-switching of the laser to provide pulses of optical energy from 150–200 nanoseconds long at pulse repetition frequencies (PRF) of 10 KHz to 100 KHz, or more. The cell 29 contains a gas which alternately switches the laser on and off by alternately saturating and recovering as a result of the passage of the optical flux from cell 27 therethrough.

In FIG. 1 the optical flux or laser beams are indicated by double lines, with arrowheads indicating the direction of propagation, the width or spacing of the lines indicating the diameter or cross sectional dimension thereof, and with a pair of vertical arrows indicating plane polarized flux parallel to the plane of the paper and pair of dots indicating flux polarized normal or perpendicular to the plane of the paper.

The flux emitted by the transmitter laser is plane polarized for example by providing the gain cell 27 with windows which only permit plane polarized flux to exit the cell. The transmitter output flux comprises the narrow beam 33 polarized vertically or parallel to the paper as illustrated by the double arrows 35. A beam splitter 85 is arranged in the output beam to deflect a small sample of the beam to detector 23 which forms a part of the transmitter frequency control loop. Since the transmitter output is series of optical pulses the detector 23 will produce at its output an electrical pulse train corresponding to the input optical pulse train. The optical frequency of the PRF of a passively Q-switched laser such as that illustrated are inter-related, so that if the optical frequency is changed the PRF will also change. In fact the optical frequency and PRF vary monotonically. The reason for this relationship is that when a Q-switched pulse leaves the gain cell the flux drops below the saturation level of the $SF_6$ absorber. When the absorber is not saturated, there is no flux output and the circulating flux in the laser builds up with time. The rate of flux buildup depends on the laser gain which in turn depends on the laser optical frequency. Similarly, the saturation and recovery times of the $SF_6$ cell 29 depend on the optical frequency and flux level. These factors together determine the PRF as a function of optical frequency. The adjustable diffraction grating 51 which forms one end of the transmitter laser cavity can be adjusted by means of piezoelectric transducer 49 to select different lines or frequencies at which the lasing medium is capable of sustaining CW laser oscillation. Thus the laser frequency can be measured by measuring the PRF and the grating 51 can be adjusted to produce a desired optical frequency and PRF. The PRF control circuit 25 contains a circuit for measuring the PRF frequency, for example, a frequency discriminator having a center frequency equal to the desired PRF. The output of the circuit 25 then adjusts the line-selection grating 51 by means of transducer 49 to select a position which will produce this desired PRF and optical frequency.

The transmitter beam passes through a second beam splitter 87 and then passes through Brewster angle duplexer 66 with only a slight offset of its optical axis due to refraction within the duplexer, as illustrated. The duplexer 66 may comprise merely a rectangular plate of gallium arsenide or zinc selinide set at its Brewster angle, B, relative to the beam axis so that it can either pass or reflect incident flux depending on the polarization thereof. Such a device is also known as a polarization coupler. The transmitted flux is polarized in such a direction (the "p" polarization) that it passes through the duplexer with only small loss. The flux then passes through quarter wave plate 65 which converts plane polarized flux to circular polarized flux, and vice versa, in known fashion. Thus all of the transmitted flux to the right of plate 65 is circularly polarized in a given sense, that is either right or left hand circularly polarized. The double headed arrows 63 and 71 indicate that transmitted flux is traveling to the right in this area and target echoes to the left. The transmitted flux can then be passed through an optional dither mechanism 67 which is desirable if a wedge type scanner is utilized, for reasons which will be explained below. The transmitted beam then passes through beam expander/compressor 69 which is an optical device similar to a telescope, which expands the transmitted beam to a diameter of approximately 2 to 3 inches so that the beam diameter is comparable to the aperture of scanner 73.

The scanner 73 is programmed and driven by circuit 77 and a position encoder 75 senses the instantaneous scanner position and hence the beam direction and provides this information to the signal processor 15 which is part of the receiver 11. The scanner deflects the beam around its optical axis 79 to form a conical field of regard (FOR) indicated by the lines 81 and 83.

Target echo signals pass back through the scanner and the beam expander/compressor 69, which now functions as a beam compressor since the echoes are traversing it in the opposite direction from the transmitted beam. Thus the target echoes emerge from the device 69 with a beam size comparable to the transmitted beam to the left of this optical device. Further, since the target echoes represent the transmitted beam reflected from targets, the echo signals will be circularly polarized in the opposite sense from that of the transmitted beam. Thus after passing through quarter wave plate 65, the target echoes will be plane polarized in a direction orthogonal to or 90° from the transmitter beam polarization. Thus the echo signals will be "s" polarized, i.e., horizontally polarized (or polarized normal to the plane of the paper of FIG. 1) when they reach duplexer 66. Since the duplexer is at its Brewster angle relative to the incident target echo beam, the echo signals will be reflected along the path indicated by the double arrowheads 68, toward receiver 11, with horizontal polarization indicated by dots 64, and with very high reflectivity.

As mentioned above, the local oscillator laser may comprise a suitably excited $CO_2$ CW laser gain cell, 41, with a laser cavity formed by partially reflective output mirror 43 and adjustable line-selection and frequency-tuning grating 45, similar to grating 51 of the transmitter laser. The local oscillator laser is arranged to produce horizontally polarized flux as indicated by the dots 39, since its polarization must match that of the target echoes at signal detector 21. The local oscillator beam 37 is reflected off of beam splitter 89 as beam 95 and then passes through duplexer 66 to merge with the target echo signals travelling along path 68 to signal detector 21. The angle of local oscillator beam 95 is chosen so that after passing through duplexer 66 the local oscillator beam will have the same direction of travel as that of the target echo signals forming part of the beam 68.

The frequency control loop for the local oscillator laser comprises detector 55 to which a sample of the local oscillator output and the transmitter output are applied, and which produces an electrical signal for application to the local oscillator frequency control circuit 53. The output of non-linear detector 55 will contain a signal having a frequency equal to the difference between the transmitter laser frequency and the local oscillator frequency, which may for example be in the vicinity of 50–100 MHz. The frequency control circuit 53 may comprise a discriminator having a center frequency tuned to this desired frequency offset between the transmitter and local oscillator lasers. The output of circuit 53 is applied to transducer 47, similar to transducer 49, to adjust the frequency of the laser 41 to a frequency which will produce the desired frequency offset, which can be considered an intermediate frequency. The two optical signals applied to detector 55 must have the same polarization if the two are to mix to produce the desired intermediate frequency, thus apparatus is provided to convert the local oscillator output polarization from horizontal to vertical to match that of the transmitter. A small sample of the transmitter beam is applied to detector 55 by means of beam splitter 87 along path 93. A sample of the local oscillator output passes through beam splitter 89, through quarter wave plate 61 and is reflected off of fixed mirror 59 to again pass through plate 61 in the other direction. The arrowheads 97 indicate the local oscillator beam travelling in both directions. The reflection of the beam at 59 together with the two passes through the quarter wave plate will result in the conversion of the horizontally polarized local oscillator output to a vertically polarized beam which is then reflected by beam splitter 89 as beam 99 to mirror 57 and then as beam 101 to beam splitter 91 where it merges with the transmitter beam 93 to form beam 103 which is applied to detector 55.

The signal detector 21 is similar to the other two detectors 23 and 53, and it is analogous to the first detector or mixer of a radio, television or radar receiver. Thus the detector 21 will have as one output an electrical pulse train at the PRF of the transmitter laser with a carrier or intermediate frequency equal to the frequency offset of the local oscillator and the transmitter lasers, plus or minus the Doppler shift of the reflected echo signal due to any relative motion between the transmitter and target along the line of sight of the beam leaving the scanner. This signal is amplified in IF amplifier 19 and then detected by second detector 17, the output of which is a dc pulse train analogous to the video signal of a microwave radar. This video signal is applied to signal processor circuit 15, together with a sample of the transmitted pulse beam from the output of detector 23 and the output of position encoder 75. The difference in timing or phase between the detected echo signals from detector 17 and the transmitter pulses from detector 23 determines the target range and the signals from encoder 75 indicate the instantaneous direction of the beam from scanner 73. Thus the signal processor can easily provide target information to display or alarm circuit 13 to accurately locate targets in range, azimuth and elevation. The display can be in a form of plan position indicator or merely a warning sound or light, or an array of lights indicating the general position and range of obstacles.

Figure 2:
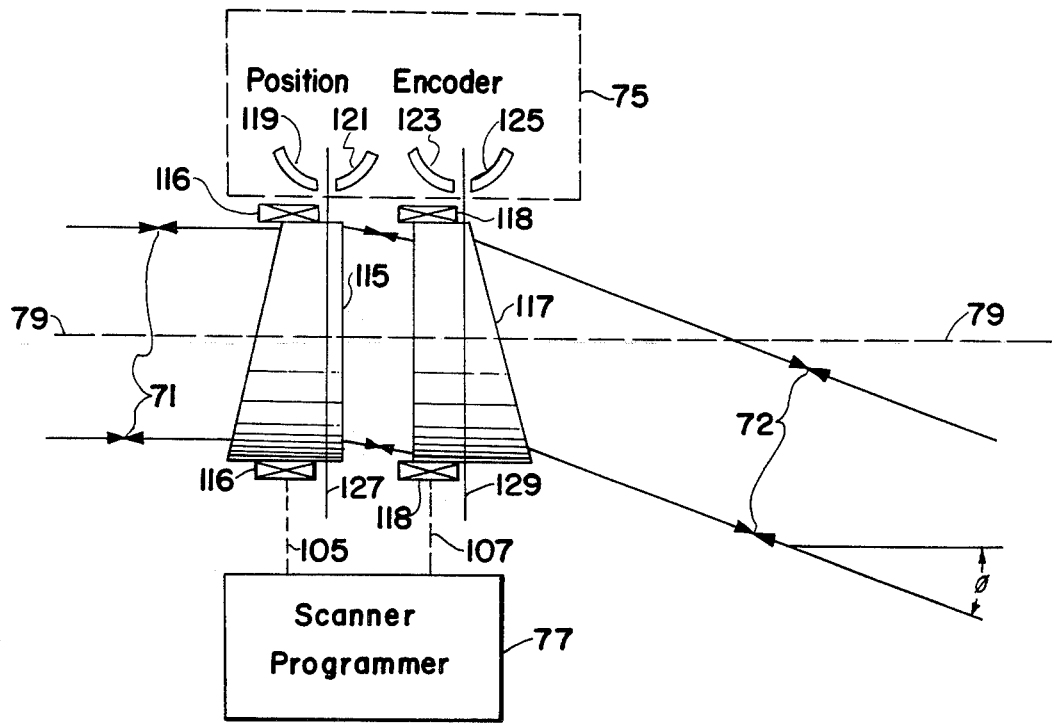
FIG. 2 illustrates a rotating wedge scanner which can be used in the apparatus of FIG. 1.

FIG. 2 shows a dual wedge scanner which may be used with the apparatus of FIG. 1. This scanner comprises a pair of rotating optical wedges 115 and 117, driven by hollow shaft tongue motors, arranged in tandem along the optical or boresight axis 79 of the radar, so that the wedges define the radar's aperture. The wedges are made of a material which is highly transparent and has a high index at refraction at the operating wavelength, for example germanium, and preferrably have circular peripheries with one face normal to the optical axis 79 which is also the axis of rotation of the wedges. The opposite flat face of the wedges are angled to form the wedge shape. A beam passing axially through such a wedge will be deflected from the optical and rotational axis 79 by an angle of $(n-1)\theta$, where n is the refractive index of the wedge and $\theta$ the wedge angle. A pair of wedges would be capable of deflecting a beam through twice this angle if they are aligned as shown in FIG. 2. This maximum angle of deflection is shown as angle $\theta$ for the output beam 72. Numerous scanning patterns can be achieved with such a pair of rotating wedges. The scanning pattern within the field of regard, FOR, depends on the relative senses of rotation of the wedges and the relative speeds. The field of regard for the dual wedge scanner illustrated would be a conical volume having an apex angle of 2 $\phi$. If the wedges have constant angular velocity, opposite senses of rotation will produce line scans when the wedge speeds of rotation are equal, and rosette-like patterns when they have slow relative speed differences. When the wedges are rotated in the same direction, spiral scans result from low relative speed of rotation differences, and slewing circular scans result from larger speed differences.

The scanner programmer 77 comprises control logic, servo amplifiers and servo motors arranged to separately drive each wedge, as indicated by connections 105 and 107, to provide a desired scan pattern. The programmer 77 can be arranged to change the pattern if so desired, for example to vary the field of view depending on the aircraft's mission or the type of obstacle to be avoided.

The wedges are shown with encoding discs 127 and 129 coaxially mounted thereon. These discs are coded for example with alternate black and white or opaque and transparent segments and are part of the position encoder 75. The devices labelled as 119, 121, 123 and 125 may be fiber optic devices adapted to read the coded segments on discs 127 and 129 so as to determine the instantaneous position of each wedge. Such a shaft position encoder is described in greater detail in an application entitled PROGRAMMABLE SCANNER/TRACKER, Ser. No. 377,727, filed on May 13, 1982 now U.S. Pat. No. 4,470,698 issued Sept. 11, 1984. The servo motors of programmer 77 which drive the wedges preferably have their hollow shaft rotors 116 and 118 coaxially mounted around the wedges to reduce backlash and inertia, as shown in FIG. 2 and as explained in the same co-pending application.

Figure 3:
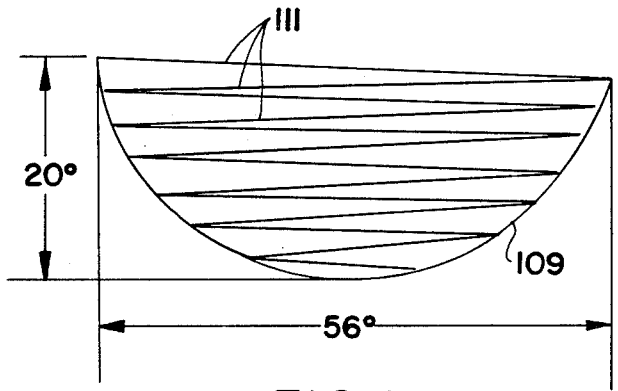
FIGS. 3 and 4 show scanning patterns which can be obtained from the apparatus of FIG. 2.

FIG. 3 shows one scanning pattern which may be easily obtained with the scanner of FIG. 2, without requiring excessive servo motor torque or speed. The arc 109 indicates the lower edge of the conical field of regard of the scanner. It can be seen that only approximately the lower half of the field of regard is occupied by the scanning lines 111. This field of view as labelled in FIG. 3 is 20° in elevation and 56° in azimuth. The larger azimuth angle may be required to detect targets to the right and left of the flight path which may present hazards if the aircraft turns steeply. As can be seen, the illustrated scan pattern is a linear one comprising generally horizontal lines with a slight slope. A pattern such as that illustrated in FIG. 3 with only 13 lines per frame can be easily implemented as far as servo motor requirements are concerned, however as can be seen, it results in numerous elongated gaps between the scanning lines. A wire or other elongated object located in any of the gaps would not be detected. To avoid this defect the transmitted beam can be passed through a dither mechanism such as 67 of FIG. 1. The dither mechanism would comprise a means to oscillate the optical beam passing therethrough rapidly up and down to fill in the gaps in a horizontal scanning pattern such as that of FIG. 3. This can be accomplished by such things as a mirror mounted on a pair of current carrying wires which oscillate in a magnetic field as does a mirror type galvanometer, or an optical wedge can be oscillated around its center. The dither frequency is made several times higher than the horizontal scanning frequency and of such amplitude that the scanning gaps are effectively filled.

Figure 4:
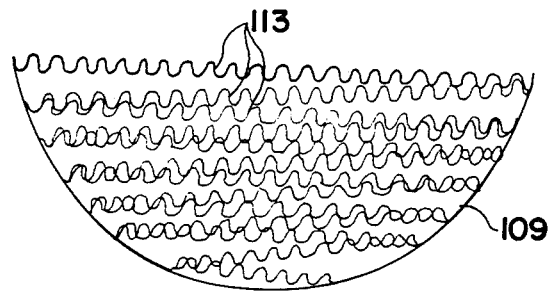

FIG. 4 illustrates the scanning pattern of FIG. 3 after it has been dithered in this way. The straight scanning lines 111 of FIG. 3 have been converted to the vertically oscillating lines 113 of FIG. 4.

The programmer 77 can be programmed so that the field of view of the scanner is changed within the field of regard. For example, the field of view of FIG. 3 could be shifted upward so that it occupies the upper half of the field of regard.

Figure 5:
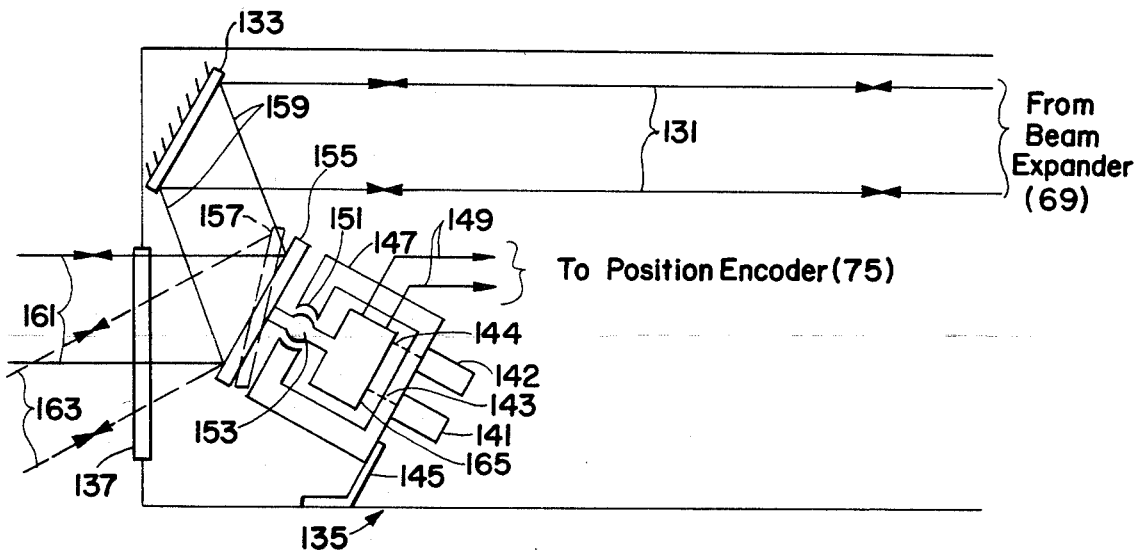
FIG. 5 shows an alternate scanner comprising a tilting mirror ball-joint scanner.

An alternate scanner is shown in FIG. 5. While this scanner lacks the versatility of the dual wedge scanner in that it has a fixed scanning pattern, it does not require a dither mechanism. The scanner of FIG. 5 is a ball joint scanner in which a moveable mirror is mounted on a ball joint which can be tilted by means of a pair of motor driven cams arranged to direct the laser beam in a desired pattern determined by the contours of the cams. In FIG. 5, the forward portion of the pod in which this equipment is carried is indicated at 135. The transmitted and echo laser beams are indicated at 131 after the transmitted beam has passed through the beam expander 69. The beam is reflected from fixed mirror 133 and is directed onto tiltable mirror 155. The scanner frame 147 includes a seat 151 in which ball 153 is mounted to form a ball joint. The tilting mirror 155 is attached to outer end of the ball 153 and the other end of the ball enters housing 165 which contains the aforementioned cams, cam followers, and a pair of pickoffs or sensors for sensing the mirror position. These sensors are connected to leads 149 which are applied to the position encoder 75 of FIG. 1. The motors 141 and 142 are mounted on the lower end of frame 147 and are mechanically connected to the housing 165 as indicated by dashed lines 143 and 144. The bracket 145 supports the ball joint mechanism. A window 137 is provided through which the transmitter and target echo beams 161 and 163 pass. The beam 161 represents the reflection from the tilting mirror at position 155 and the beam 163 the reflection from the same tilting mirror at the dashed line position 157.

Each of the motors 141 and 142 may drive separate cams within housing 165 with each cam arranged to move the ball and the mirror around different orthogonal axes to perform the scanning function. Alternatively, the motors and cams may be mounted on the frame 147 under the mirror so that the mirror is directly driven.

Figure 6:
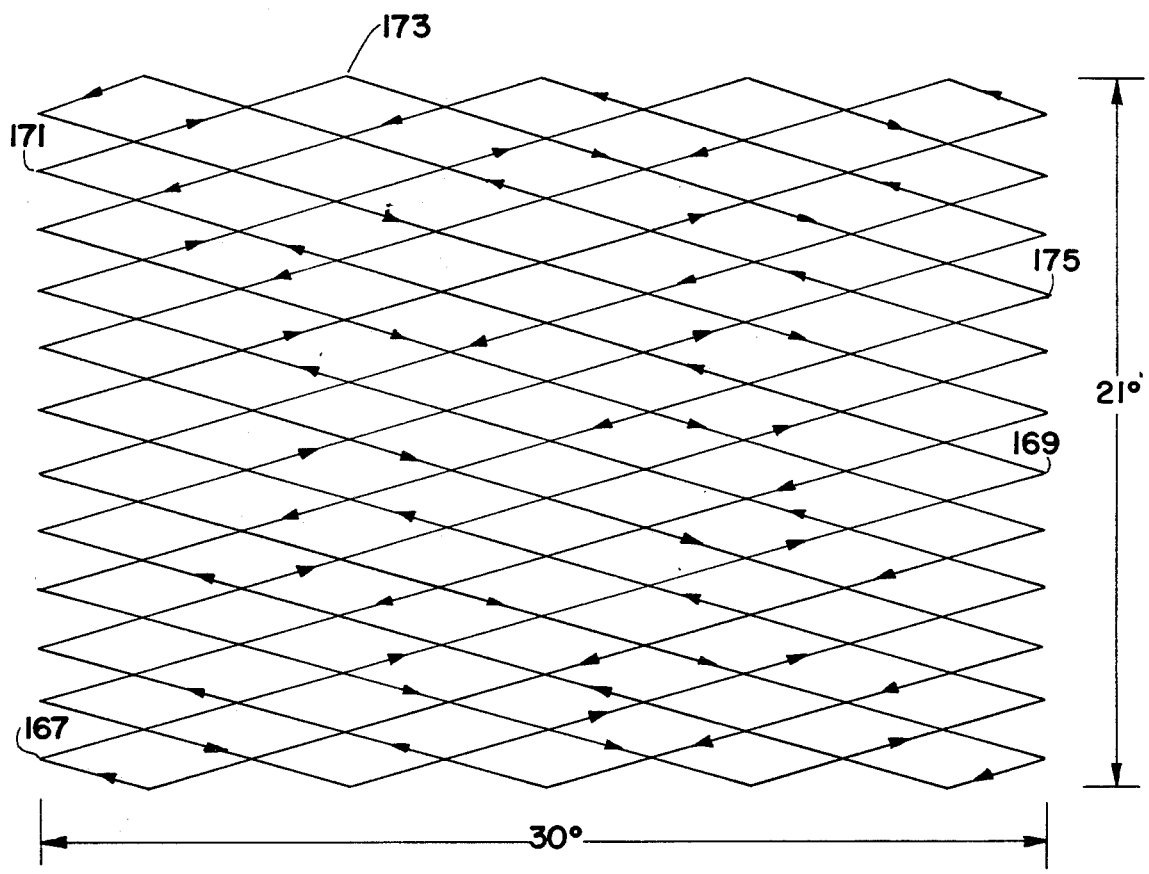
FIG. 6 is a scanning pattern which can be obtained by use of the scanner of FIG. 5.

A ball-joint scanner of this type can be easily arranged to provide a diagonal scanning pattern such as that of FIG. 6. Such a pattern will provide at least one hit per frame on any isolated target and will produce numerous hits per frame on any elongated target no matter what its orientation. The illustrated scanning pattern comprises an array of flattened diamond shaped elements formed by diagonally scanning the field of view which may have a horizontal extent of 30° and a vertical extent of 21°, as indicated in FIG. 6. In the scanning pattern shown, the beam is scanned at such horizontal and vertical speeds that linear diagonal scanning lines are formed which interlace in such a manner as to produce the illustrated flattened diamond shaped elements. The illustrated scanning pattern has 5 of these diamond-shaped elements in the horizontal direction and 12 along the vertical direction. Assuming that the scanning starts at point 167, the beam will scan to points 169, 171, 173, 175, etc. following the arrowheads on the scanning lines until the starting point 167 is reached, after all lines have been scanned. It can be seen that all elongated target of any orientation will be picked up by such a scanning pattern during each scanning cycle or frame time. Since there are no blank spots if such a pattern is used, the dither mechanism shown in FIG. 1 need not be utilized. The pattern of FIG. 6 is only illustrative and in practice many more diagonal lines would be employed.

Figure 7:
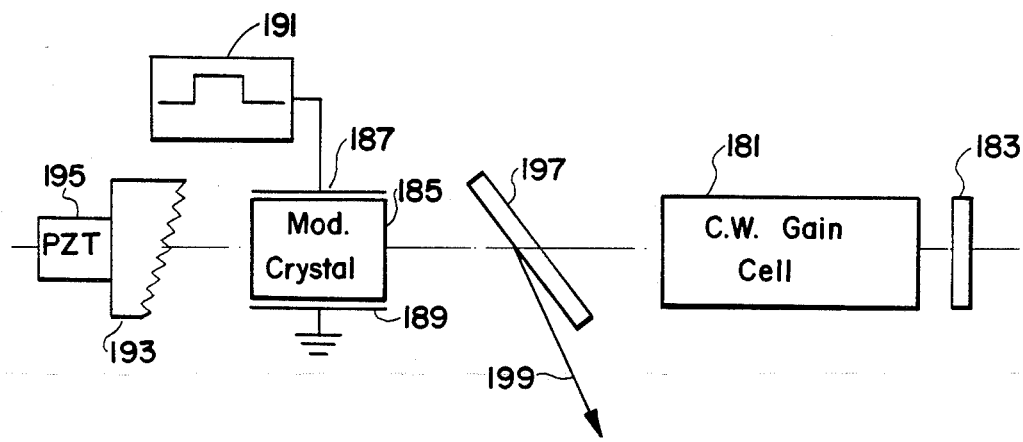
FIGS. 7 and 8 show alternate types of modulated transmitters which can be used in the circuit of FIG. 1, and, FIG. 9 shows a pod containing the novel object detector adapted for attachment to an aircraft body.

The intracavity actively modulated laser of FIG. 7 may be substituted for the passively modulated laser of FIG. 1. This transmitter laser comprises a laser cavity enclosed by highly reflective mirror 183 and line selection grating 193 which is similar to the grating 51 of FIG. 1 and is driven by the transmitter frequency control system applied to transducer 195. A suitably excited CW gain cell 181 is provided. The modulator crystal 185 may be cadmium telluride with electrodes 187 and 189 applied thereto for application of modulating voltages from modulating voltage source 191. Source 191 would produce a square wave with a shape and frequency selected to provide the desired laser PRF and pulse length. The laser cavity also includes an output coupler 197 which may be a gallium arsenide plate which functions as the duplexer 66 of FIG. 1 to couple out of the cavity optical flux along output path 199. The modulator crystal 185, when pulsed by source 191 provides optical flux with the proper direction of polarization to be reflected from the coupler 197 along the output path. A transmitter of this type can yield extremely short pulses, however it is less efficient and more complex than the preferred transmitter shown in FIG. 1.

Figure 8:
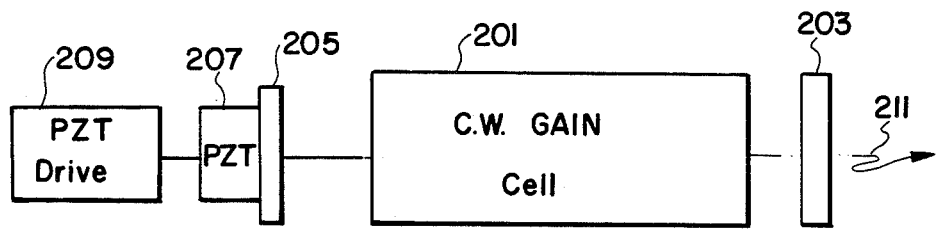

A second alternative laser transmitter is shown in FIG. 8. This is a CW frequency modulated or FM chirped laser in which a CW laser is frequency modulated, for example by vibrating one of the cavity mirrors to change the cavity length and thus the operating frequency. The difference in frequency between the target echo signals and the instantaneous transmitter frequency is an indication of target range. Use of this type of transmitter eliminates the need for a local oscillator with its frequency control circuit. Also, the CW laser is inherently more efficient than a pulsed laser since its average power is the same as its peak power. A simple form of FM CW laser is shown in FIG. 8. The laser cavity comprises the space between partially reflective output mirror 203 and moveable mirror 205, which is mounted for vibratory movement on piezoelectric transducer 207. The transducer is electrically driven by PZT drive 209 which may comprise an oscillator operating at a frequency at which the laser is to be modulated. The gain cell 201 functions as do the gain cells of the other embodiments and the frequency modulated CW optical flux passes through output mirror 203 as output 211.

Figure 9:
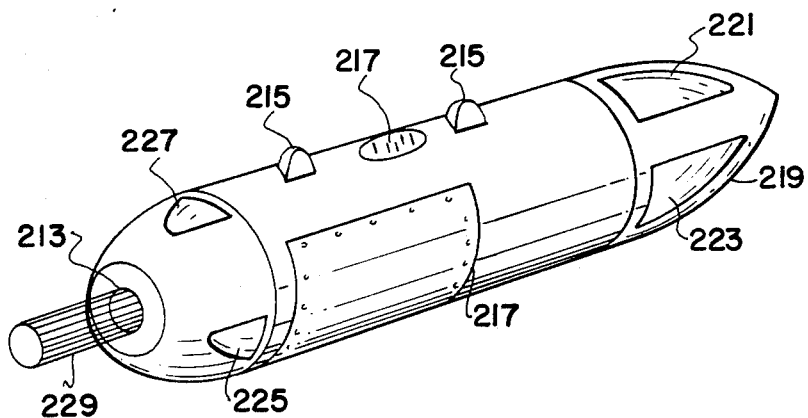

FIG. 9 is a pictorial view of a pod adapted to contain most of the circuitry and apparatus of the present invention. This pod is adapted to be attached to the fuselage of an aircraft, which would usually be a helicopter. The pod would utilize the aircraft's power supply and the display and/or alarm circuit 13 would normally be on the aircraft's panel. Everything else would be contained in the pod of FIG. 9. With this arrangement the pod can be detached when not needed for a particular mission and thus save its weight and drag. The pod is generally cylindrical with tailcone 219 and aperture 213 in the nose, through which the laser beam 229 passes. Mounting brackets 215 are provided for attachment to the aircraft and electrical connector 217 interfaces with a mating connector on the aircraft. Cooling air is taken in at a pair of ducts 225 and 227 near the nose and the exhaust cooling air exits from ducts 221 and 223 in the tailcone.

While the invention has been described in connection with illustrative embodiments, obvious variations thereof will occur to those skilled in the art, accordingly, the invention should be limited only by the scope of the appended claims.

I claim:

1. An optical radar adapted to detect elongated objects in the path of a low flying aircraft, comprising: a pulsed optical transmitter laser comprising a continuous wave (CW)$CO_2$ gain cell which is constrained to emit optical flux plane polarized in a given direction, said transmitter being passively Q-switched by means of a gaseous cell within the cavity thereof, a first control loop adapted to control the optical frequency and pulse repetition frequency (PRF) of said transmitter, a continuous wave (CW) local oscillator laser operating at a frequency offset from said transmitter frequency by a fixed intermediate frequency, said local oscillator being constrained to emit plane polarized optical flux orthogonal to that emitted by said transmitter, a second control loop responsive to the optical flux from said transmitter and the optical flux from said local oscillator for controlling the optical frequency of said local oscillator laser to maintain said fixed intermediate frequency offset between said transmitter flux and said local oscillator flux, a duplexer comprising a dielectric plate substantially transparent at the operating frequencies of both of said lasers, said duplexer being disposed in the path of said transmitter's flux output at its Brewster angle so that transmitter flux with said given direction of polarization will pass therethrough along a first path toward the output of said radar and target echo signals with said orthogonal direction of polarization returning to said transmitter from the target along said first path will be reflected by said duplexer along a second path disposed at an angle with respect to said first path, said duplexer being also disposed in the path of said local oscillator laser flux output at its Brewster angle so that said local oscillator flux with said orthogonal direction of polarization will pass therethrough along said second path and mix with said target echo signals, said transmitter flux passing along said first path toward the output of the radar through a quarter wave plate and a beam expander-compressor to a scanner, said scanner being adapted to move the transmitted optical beam over a desired scanning pattern, a scanning programmer and drive mechanism and a position encoder connected to said scanner, said target echo signals passing through said scanner, beam expander/compressor and quarter wave plate and emerging from said quarter wave plate with plane polarization in said orthogonal direction, whereby said target echo signals will be reflected by said duplexer along said second path to a receiver, said receiver comprising a signal detector to which said target echo signals from said duplexer and said local oscillator output signals from said duplexer are applied, means to detect said intermediate frequency in the output of said signal detector, and a signal processor adapted to process the target signal echoes applied thereto from said signal detector and correlate them with the output of said position encoder to operate a display or alarm circuit connected to said signal processor circuit.

2. The optical radar of claim 1 wherein said scanner comprises a pair of rotating wedges each driven by a hollow shaft servo motor which is part of said scanner programmer and driver and each said wedge includes an encoding disc which is part of said position encoder, whereby said scanner can be programmed to provide different scanning patterns by programming the speed and senses of rotation of said servo motors.

3. The optical radar of claim 2 wherein a dither mechanism is inserted in the path of said transmitter's optical flux between said duplexer and said scanner.

4. The optical radar of claim 3 wherein said detectors are cryogenically cooled photovoltaic diodes sensitive to radiation of the operating frequencies of said lasers.

5. The optical radar of claim 1 wherein said scanner comprises a ball-joint scanner comprising a moveable mirror mounted on one end of a ball-joint, the other end of said ball-joint being moved by a motor driven system of cams to tilt said mirror in such a way that the transmitter's beam will be deflected over a desired scanning pattern.

6. The optical radar of claim 5 wherein said scanning pattern comprises a diagonal system of straight lines interlaced in such a manner as to produce a system of diamond-shaped elemental areas.

* * * * *